United States Patent
Kojima et al.

(10) Patent No.: US 11,881,048 B2
(45) Date of Patent: Jan. 23, 2024

(54) MONITORING DEVICE, LEARNING APPARATUS, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 188 days.

(21) Appl. No.: 17/465,818

(22) Filed: Sep. 2, 2021

(65) Prior Publication Data

US 2022/0100987 A1    Mar. 31, 2022

(30) Foreign Application Priority Data

Sep. 28, 2020    (JP) .................................. 2020-162707

(51) Int. Cl.
   *G06V 40/16*      (2022.01)
   *G06T 7/70*       (2017.01)
   (Continued)

(52) U.S. Cl.
   CPC ........ *G06V 40/161* (2022.01); *G06F 11/3013* (2013.01); *G06F 21/6254* (2013.01);
   (Continued)

(58) Field of Classification Search
   CPC .. G06V 40/161; G06V 2201/07; G06V 20/52; G06F 11/3013; G06F 21/6254;
   (Continued)

(56) References Cited

U.S. PATENT DOCUMENTS 6,456,399 B1 * 9/2002 Ho ..................... H04N 1/32683
                                                    358/404
10,803,334 B1 * 10/2020 Lin .......................... G06N 3/08
(Continued)

FOREIGN PATENT DOCUMENTS

JP    2015162232 A    9/2015
JP    2016191973 A    11/2016
(Continued)

OTHER PUBLICATIONS

Extended European Search Report for European Patent Application No. 21195742.8, issued by the European Patent Office dated Feb. 17, 2022.

(Continued)

*Primary Examiner* — Amara Abdi

(57) ABSTRACT

Provided is a monitoring device including: a captured image acquiring unit configured to acquire an image captured by a monitoring camera; a monitoring logic execution unit configured to generate a monitoring result corresponding to the image captured by the monitoring camera, by using a trained monitoring logic; an image transmitting unit configured to decimate the image captured by the monitoring camera and transmit a result to a learning apparatus performing training processing on another monitoring logic of a same type as the monitoring logic; a monitoring logic receiving unit configured to receive, from the learning apparatus, the other monitoring logic additionally trained by the learning apparatus by using the image from the image transmitting unit; and an updating unit configured to update the monitoring logic executed by the monitoring logic execution unit to the other monitoring logic received by the monitoring logic receiving unit.

12 Claims, 6 Drawing Sheets

(51) Int. Cl.
    *G06F 11/30*     (2006.01)
    *G06F 21/62*     (2013.01)
    *G06T 5/00*     (2006.01)

(52) U.S. Cl.
    CPC ............... *G06T 5/007* (2013.01); *G06T 7/70* (2017.01); *G06T 2207/20081* (2013.01); *G06T 2207/30196* (2013.01); *G06T 2207/30232* (2013.01); *G06V 2201/07* (2022.01)

(58) Field of Classification Search
    CPC . G06T 5/007; G06T 7/70; G06T 2207/20081; G06T 2207/30196; G06T 2207/30232; G08B 13/19613
    See application file for complete search history.

(56) References Cited

U.S. PATENT DOCUMENTS

| | | | |
|---|---|---|---|
| 2012/0134532 A1 | 5/2012 | Ni | |
| 2015/0092978 A1 | 4/2015 | Wu | |
| 2016/0292512 A1 | 10/2016 | Yoshihiro | |
| 2017/0070657 A1 | 3/2017 | Yokomizo | |
| 2018/0114299 A1 | 4/2018 | Hattori | |
| 2019/0163965 A1* | 5/2019 | Yoo | G06V 40/176 |
| 2020/0083355 A1 | 3/2020 | Xu | |
| 2020/0389627 A1* | 12/2020 | Okumura | H04N 7/183 |
| 2021/0027485 A1* | 1/2021 | Zhang | G06T 7/11 |

FOREIGN PATENT DOCUMENTS

| | | | | |
|---|---|---|---|---|
| JP | 2017212647 A | | 11/2017 | |
| JP | 2018072893 A | | 5/2018 | |
| JP | 2019197373 A | | 11/2019 | |
| JP | 2019213116 | * | 12/2019 | ............. G06T 7/00 |
| JP | 2019213116 A | | 12/2019 | |
| WO | 2018167904 A1 | | 9/2018 | |
| WO | 2019229789 A1 | | 12/2019 | |
| WO | WO2019229789 | * | 12/2019 | ............. G06T 7/00 |
| WO | 2020083355 A1 | | 4/2020 | |

OTHER PUBLICATIONS

Office Action issued for counterpart Japanese Application No. 2020-162707, issued by the Japanese Patent Office dated Jan. 17, 2023 (drafted on Jan. 5, 2023).

Office Action issued for counterpart Japanese Application No. 2020-162707, issued by the Japanese Patent Office dated Jun. 20, 2023 (drafted on Jun. 7, 2023).

* cited by examiner

| LOGIC ID | VERSION INFORMATION | IMAGE CAPTURING CONDITION | DEVICE ID |
|---|---|---|---|
| L001 | ver. 4 | APPLICATION: FOR INDOOR USE, INSTALLED LOCATION: INDOORS, ... | aaa1, ... |
| L002 | ver. 7 | APPLICATION: FOR OUTDOOR USE, INSTALLED LOCATION: OUTDOORS, ... | aaa2, ... |
| ... | ... | ... | ... |

| DEVICE ID | CAMERA ID | IMAGE CAPTURING CONDITION | LOGIC ID | VERSION INFORMATION |
|---|---|---|---|---|
| aaa1 | c-O1 | APPLICATION: FOR INDOOR USE, INSTALLED LOCATION: INDOORS, ... | L001 | ver. 3 |
|  | c-O2 | APPLICATION: FOR OUTDOOR USE, INSTALLED LOCATION: OUTDOORS, ... |  |  |
|  | ... | ... |  |  |
| aaa2 | c-O3 | ... | L002 | ver. 7 |
| ... | ... | ... | ... | ... |

*FIG. 3*

MONITORING DEVICE, LEARNING APPARATUS, METHOD AND STORAGE MEDIUM

The contents of the following Japanese patent application(s) are incorporated herein by reference:
2020-162707 filed in JP on Sep. 28, 2020

BACKGROUND

1. Technical Field

The present invention relates to a monitoring device, a learning apparatus, a method, and a storage medium.

2. Related Art

Conventionally, a variety of security systems using a monitoring camera has been proposed (for example, see Patent Document 1).

[Patent Document 1] Japanese Patent Application Publication No. 2015-162232

SUMMARY

According to a first aspect of the present invention, a monitoring device is provided. The monitoring device may include a captured image acquiring unit configured to acquire an image captured by a monitoring camera. The monitoring device may include a monitoring logic execution unit configured to generate a monitoring result corresponding to the image captured by the monitoring camera, by using a trained monitoring logic. The monitoring device may include an image transmitting unit configured to decimate the image captured by the monitoring camera and transmit a result to a learning apparatus performing training processing on another monitoring logic of a same type as the monitoring logic. The monitoring device may include a monitoring logic receiving unit configured to receive, from the learning apparatus, the other monitoring logic additionally trained by the learning apparatus by using the image from the image transmitting unit. The monitoring device may include an updating unit configured to update the monitoring logic executed by the monitoring logic execution unit to the other monitoring logic received by the monitoring logic receiving unit.

According to a second aspect of the present invention, a learning apparatus is provided. The learning apparatus may include an image receiving unit configured to receive a captured and decimated image from a monitoring device generating a monitoring result corresponding to an image captured by a monitoring camera, by using a monitoring logic. The learning apparatus may include a training processing unit configured to additionally train another monitoring logic of a same type as the monitoring logic of the monitoring device with training data using the image received by the image receiving unit. The learning apparatus may include a monitoring logic transmitting unit configured to transmit the other monitoring logic additionally trained to the monitoring device.

According to a third aspect of the present invention, a method is provided. The method may include a captured image acquiring step of acquiring an image captured by a monitoring camera. The method may include a monitoring logic execution step of generating a monitoring result corresponding to the image captured by the monitoring camera, by using a trained monitoring logic. The method may include an image transmitting step of decimating the image captured by the monitoring camera and transmitting a result to a learning apparatus performing training processing on another monitoring logic of a same type as the monitoring logic. The method may include a monitoring logic receiving step of receiving, from the learning apparatus, the other monitoring logic additionally trained by the learning apparatus by using the image transmitted in the image transmitting step. The method may include an updating step of updating the monitoring logic executed in the monitoring logic execution step to the other monitoring logic received in the monitoring logic receiving step.

According to a fourth aspect of the present invention, a method is provided. The method may include an image receiving step of receiving a captured and decimated image from a monitoring device generating a monitoring result corresponding to an image captured by a monitoring camera, by using a monitoring logic. The method may include a training processing step of additionally training another monitoring logic of a same type as the monitoring logic of the monitoring device with training data using the image received in the image receiving step. The method may include a monitoring logic transmitting step of transmitting the other monitoring logic additionally trained to the monitoring device.

According to a fifth aspect of the present invention, a storage medium having a program stored thereon is provided. The program may cause a computer to function as a captured image acquiring unit configured to acquire an image captured by a monitoring camera. The program may cause the computer to function as a monitoring logic execution unit configured to generate a monitoring result corresponding to the image captured by the monitoring camera, by using a trained monitoring logic. The program may cause the computer to function as an image transmitting unit configured to decimate the image captured by the monitoring camera and transmit a result to a learning apparatus performing training processing on another monitoring logic of a same type as the monitoring logic. The program may cause the computer to function as a monitoring logic receiving unit configured to receive, from the learning apparatus, the other monitoring logic additionally trained by the learning apparatus by using the image from the image transmitting unit. The program may cause the computer to function as an updating unit configured to update the monitoring logic executed by the monitoring logic execution unit to the other monitoring logic received by the monitoring logic receiving unit.

According to a sixth aspect of the present invention, a storage medium having a program stored thereon is provided. The program may cause a computer to function as an image receiving unit configured to receive a captured and decimated image from a monitoring device generating a monitoring result corresponding to an image captured by a monitoring camera, by using a monitoring logic. The program may cause the computer to function as a training processing unit configured to additionally train another monitoring logic of a same type as the monitoring logic of the monitoring device with training data using the image received by the image receiving unit. The program may cause the computer to function as a monitoring logic transmitting unit configured to transmit the other monitoring logic additionally trained to the monitoring device.

The summary clause does not necessarily describe all necessary features of the present invention. The present invention may also be a sub-combination of the features described above.

BRIEF DESCRIPTION OF THE DRAWINGS

FIG. 2 illustrates contents stored in a correspondence table 501A.

FIG. 3 illustrates contents stored in a correspondence table 501B.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments are essential to the solution of the invention.

1. System 1

Figure 1:
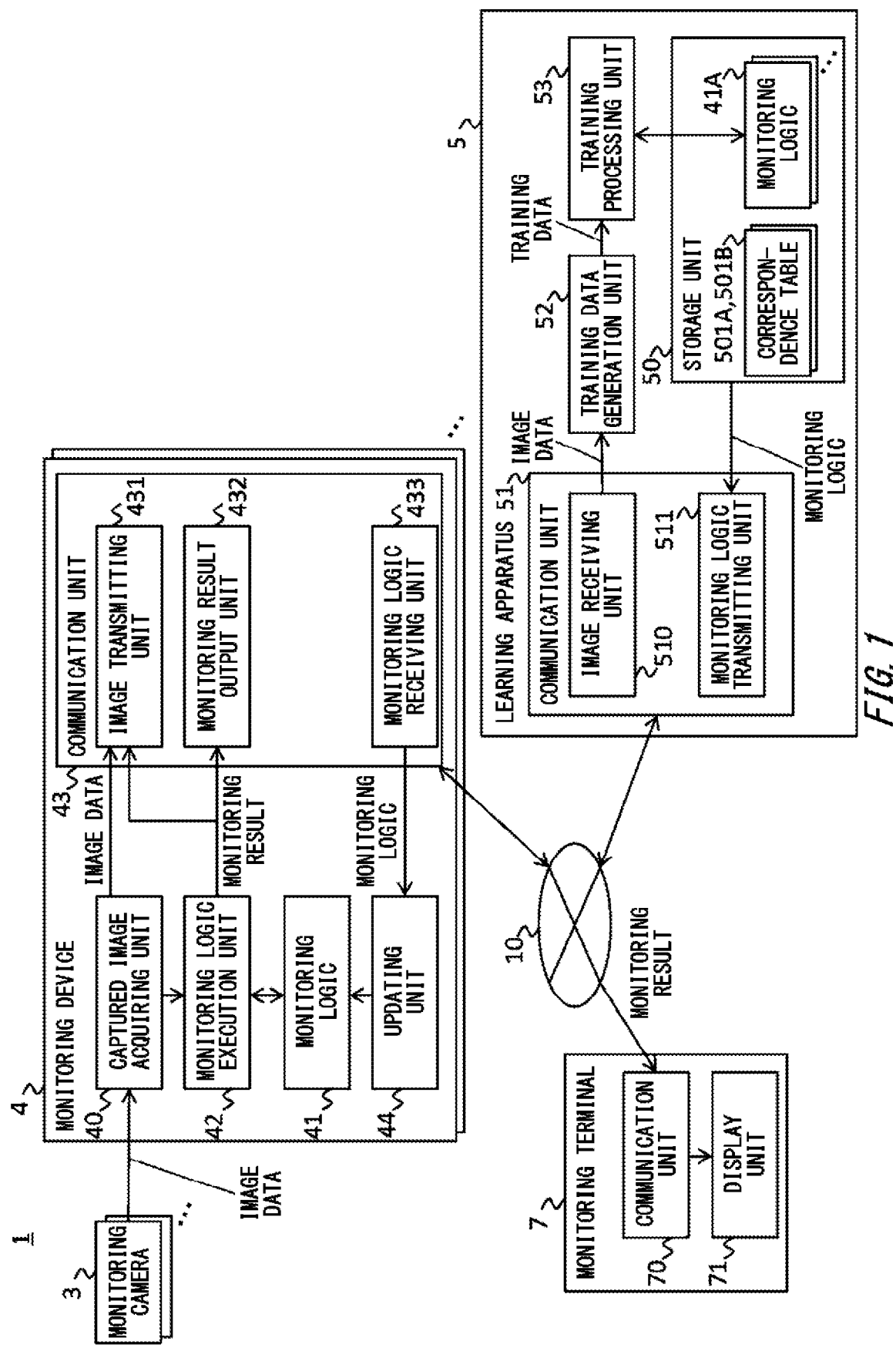
FIG. 1 illustrates a system 1 according to the present embodiment.

FIG. 1 illustrates a system 1 according to the present embodiment.

The system 1 includes one or a plurality of monitoring cameras 3, one or a plurality of monitoring devices 4, a learning apparatus 5, and a monitoring terminal 7, and performs remote monitoring of a monitored region.

The monitored region may be a region monitored by the monitoring terminal 7, and may include a region (also referred to as an image-captured region) an image of which is captured by each monitoring camera 3. In the present embodiment, the monitored region is a site of a facility as one example, but it may also be a road, a sideway, or the like. The facility may be a plant, a school, a resident, a station, an airport, a museum, a hospital, or a store (as one example, a restaurant or a retail store) or may be a theme park, an amusement park, or an attraction of the same or the like. Examples of the plant include, besides an industrial plant such as a chemical plant or a biological plant, a plant for managing and controlling a wellhead or its surrounding area of a gas field, an oil field or the like, a plant for managing and controlling power generation such as hydraulic power generation, thermal power generation and nuclear power generation, a plant for managing and controlling energy harvesting such as solar photovoltaic generation, wind power generation or the like, and a plant for managing and controlling water and sewerage, a dam or the like. The facility may be provided with a variety of security sensors (not illustrated) besides the monitoring camera 3.

Of the components of the system 1, the monitoring device 4, the learning apparatus 5, and the monitoring terminal 7 may be connected to each other via a communication network 10. In the figure, the monitoring device 4, the learning apparatus 5, and the monitoring terminal 7 are connected via a single communication network 10, but may be connected via different communication networks.

The communication network 10 may be composed by including various networks such as the Internet, a wide area network (WAN), and a local area network, or the combination thereof. The communication network 10 may include a connection point which uses at least one of wired communication or wireless communication. The communication network 10 may be achieved by a dedicated line separated from a public line such as the Internet.

1.1 Monitoring Camera 3

Each of the monitoring cameras 3 captures an image of the image-captured region. Each monitoring camera 3 may supply image data obtained by the image capturing, to the monitoring device 4. The image data may be moving image data, and the monitoring camera 3 may generate the moving image data (also referred to as video) by constantly capturing images. For example, each monitoring camera 3 may capture images at 30 f/s. The image data may be still image data. In this case, the monitoring camera 3 may capture an image at a periodical timing, to generate still image data. The monitoring camera 3 may be a camera for visible light or may be a camera for infrared light or ultraviolet light (as one example, X-ray).

1.2. Monitoring Device 4

Each monitoring device 4 is connected to at least one monitoring camera 3. Each monitoring device 4 includes a captured image acquiring unit 40, a monitoring logic 41, a monitoring logic execution unit 42, a communication unit 43, and an updating unit 44.

1.2. (1) Captured Image Acquiring Unit 40

The captured image acquiring unit 40 acquires an image captured by the monitoring camera 3. The captured image acquiring unit 40 may acquire the image data from each monitoring camera 3 connected to the monitoring device 4. The captured image acquiring unit 40 may supply the acquired image data to the monitoring logic execution unit 42 and the communication unit 43. For example, the captured image acquiring unit 40 may supply the image data, associated with identification information (also referred to as camera ID) of each monitoring camera 3, to the monitoring logic execution unit 42. The captured image acquiring unit 40 may store the acquired image data in a storage area (not illustrated) of the monitoring device 4. The storage area may store the image data for at least a reference period (as one example, five days), and may sequentially overwrite and save new image data.

1.2. (2) Monitoring Logic 41

In response to an input of the image data as an analysis target, the monitoring logic 41 may perform image analysis on the image data and output a result of determining whether the image-captured region is normal or abnormal. The determination result may include the certainty of the determination. The certainty indicates a likelihood of the determination result being correct, and may be a percentage such as 40%, or a ratio such as 0.4, as one example.

The monitoring logic 41 may output a determination result indicating that the image-captured region is abnormal, when a detection target is detected. The detection target is an object to be detected (also referred to as a target object) among objects included in the image data. In response to the detection of a target object, the monitoring logic 41 may further output feature data indicating a feature of the target object.

The target object may be an object that requires special attention in terms of security, among objects detectable by the image analysis. For example, the target object may be at least one of a human face, an entire human body (as one example, an adult or a child), clothing, a vehicle (as one example, a traveling vehicle or a parked vehicle), vehicle model, vehicle color, a license plate, a certain object (as one example, a bag or a weapon), and the like. In addition, the target object may be a face of a particular person or a particular vehicle.

If the target object is a human face, the feature data may indicate the feature of the face within the image. The feature of the face within the image may be the positional relationship of the feature points of the face, may be the color of the pupil, the skin, or the hair, or may be the color, shape, or the like of an accessory (as one example, glasses, earrings, or the like). Furthermore, if the target object is a vehicle, the feature data may indicate the vehicle model of the vehicle within the image. Furthermore, if the target object is a license plate, the feature data may indicate the number of the vehicle within the image.

The image that is the analysis target of the image analysis by the monitoring logic 41 may be a still image, and may be a frame extracted from a moving image as one example. The detection target of the monitoring logic 41 may be an operation (as one example, an operation of stealing an item) performed over a plurality of frames. In this case, image data that is the analysis target of the image analysis performed by the monitoring logic 41 may be moving image data of a reference time width (as one example, 10 seconds or 1 minute). The monitoring logic 41 may perform operation analysis on the moving image data of the reference time width, and in response to the detection of a predetermined operation, output a determination result indicating that the image-captured region is abnormal or feature data indicating a feature of the object that has performed the operation.

In the present embodiment, as one example, the monitoring device 4 is described as including a single monitoring logic 41, but may include a plurality of monitoring logics 41. In this case, at least one of the detection targets or image capturing conditions suitable for the analysis may differ between the plurality of monitoring logics 41. The image capturing condition may be a condition determined by the monitoring camera 3 that captures an image, or may be a condition determined based on the installation status of the monitoring camera 3 or the image capturing timing. For example, the image capturing condition of the image data may be at least one of the performance of the monitoring camera 3 which captures images (such as the number of pixels, a frame rate, or the like), the application (indoor, outdoor, or the like), the image capturing direction (the bearing, the orientation relative to the light source, the orientation relative to the target object which is possibly included in the image data, or the like), the installed location, (the address, the GPS data, the position relative to the target object which is possibly included in the image data, indoor, outdoor, or the like), the number of target objects possibly included in the image data (single or multiple), the situation of the target object possibly included in the image data (moving, stopped, or the like), the hours of the image capturing, the situation of the image-captured region at a time of the image capturing (the color and brightness of the illumination, the weather, or the like), or the like.

The monitoring logic 41 may be generated based on training processing. In the present embodiment, as one example, the monitoring logic 41 may be a model obtained by machine learning such as deep learning, but this should not be construed as a limiting sense.

1.2 (3) Monitoring Logic Execution Unit 42

The monitoring logic execution unit 42 generates a monitoring result corresponding to an image captured by the monitoring camera 3, by using the trained monitoring logic 41.

The monitoring logic execution unit 42 may generate, for each monitoring camera 3, a monitoring result including the camera ID of the monitoring camera 3 and a determination result obtained by the monitoring logic 41 (in the present embodiment, as one example, a determination result indicating "whether the image-captured region is normal or abnormal", the certainty of the determination, and the like). In response to the detection of the target object by the monitoring logic 41, the monitoring logic execution unit 42 may generate the monitoring result further including at least one of image data with which the target object is detected, or the feature data of the detected target object. When the monitoring logic execution unit 42 uses a plurality of monitoring logics 41, the monitoring logic execution unit 42 may generate the monitoring result for each monitoring logic 41, with the plurality of monitoring logics 41 operating in parallel or at different timings.

The monitoring logic execution unit 42 may supply the monitoring result to the communication unit 43. In the present embodiment, as one example, the monitoring logic execution unit 42 may supply the monitoring result to an image transmitting unit 431 and a monitoring result output unit 432 of the communication unit 43 described later.

1.2. (4) Communication Unit 43

The communication unit 43 communicates with the learning apparatus 5 and the monitoring terminal 7 via the communication network 10. The communication unit 43 includes the image transmitting unit 431, the monitoring result output unit 432, and, a monitoring logic receiving unit 433.

1.2. (4-1) Image Transmitting Unit 431

The image transmitting unit 431 decimates the image captured by the monitoring camera 3 and transmits the result to the learning apparatus 5.

For example, the image transmitting unit 431 may determine, to be a transmission target image, a part of a plurality of images for each unit amount analyzed by the monitoring logic 41. The image transmitting unit 431 determines the transmission target image for each monitoring camera 3, and provides the image with a tag indicating the camera ID of the monitoring camera 3 that has captured the image.

The image transmitting unit 431 may randomly determine the transmission target image data, may regularly decimate images in the order of image data pieces of the respective units of analysis by the monitoring logic 41, or may decimate the images based on the content and the analysis result of the image data. In the present embodiment, as one example, the image transmitting unit 431 may decimate images based on the monitoring result supplied from the monitoring logic execution unit 42.

1.2. (4-2) Monitoring Result Output Unit 432

The monitoring result output unit 432 outputs the monitoring result generated by the monitoring logic execution unit 42. The monitoring result output unit 432 may transmit the monitoring result to a preset transmission destination, and may transmit the monitoring result to the monitoring terminal 7 in the present embodiment as one example. The transmission destination is not limited to this, and may be an owner of the facility, or a police station or a hospital in a region including the facility. The monitoring result output unit 432 may display the monitoring result on a monitor (not illustrated) of the monitoring device 4.

1.2. (4-3) Monitoring Logic Receiving Unit 433

The monitoring logic receiving unit 433 receives another monitoring logic 41A from the learning apparatus 5. The monitoring logic 41A may be a monitoring logic of the same type as the monitoring logic 41 or may be a monitoring logic the version of which is different from that of the monitoring logic 41. As one example, the monitoring logic 41A may be a monitoring logic of a newer version than the monitoring logic 41. The monitoring logic receiving unit 433 may supply the received monitoring logic 41A to the updating unit 44.

1.2. (5) Updating Unit 44

The updating unit 44 updates the monitoring logic 41 executed by the monitoring logic execution unit 42, to the monitoring logic 41A received by the monitoring logic receiving unit 433. For example, the updating unit 44 may replace the monitoring logic 41 with the monitoring logic 41A.

1.3. Learning Apparatus 5

The learning apparatus 5 performs training processing on one or a plurality of monitoring logics 41A. The learning apparatus 5 includes a storage unit 50, a communication unit 51, a training data generation unit 52, and a training processing unit 53.

1.3. (1) Storage Unit 50

The storage unit 50 stores the plurality of monitoring logics 41A and two correspondence tables 501A and 501B.

The plurality of monitoring logics 41A may be monitoring logics of types different from one another. For example, at least one of the detection targets or the image capturing conditions suitable for the analysis may differ between the monitoring logics 41A. The plurality of monitoring logics 41A may each be of the latest version. The monitoring logics 41A may each be provided with a tag indicating a logic ID and version information. The version information may indicate the number of times the training processing has been performed on the monitoring logic 41A.

The correspondence table 501A stores information on each of the monitoring logics 41A. The correspondence table 501A may store the logic ID, the latest version information (in the present embodiment, as one example, version information on the monitoring logic 41A in the storage unit 50), the image data image capturing condition suitable for the analysis, and the device ID of the monitoring device 4 using the monitoring logic 41 of the same type as the monitoring logic 41A, in association with each other.

The correspondence table 501B stores information on each monitoring device 4. The correspondence table 501B may store the device ID of the monitoring device 4, the camera ID of each monitoring camera 3 connected to the monitoring device 4, image data image capturing condition of the monitoring camera 3, the logic ID of each monitoring logic 41 used by the monitoring device 4, and the version information thereof, in association with each other.

1.3. (2) Communication Unit 51

The communication unit 51 communicates with the monitoring device 4 and the monitoring terminal 7 via the communication network 10. The communication unit 51 includes an image receiving unit 510 and a monitoring logic transmitting unit 511.

1.3. (2-1) Image Receiving Unit 510

The image receiving unit 510 receives an image decimated (also referred to as a decimated image) from the monitoring device 4. The image receiving unit 510 may supply the decimated image received, to the training data generation unit 52.

1.3. (2-2) Monitoring Logic Transmitting Unit 511

The monitoring logic transmitting unit 511 transmits the monitoring logic 41A on which the training processing has been performed by the training processing unit 53 to the monitoring device 4. The monitoring logic transmitting unit 511 may transmit the monitoring logic 41A to the monitoring device 4 with each device ID associated, in the correspondence table 501A, with the logic ID of the monitoring logic 41A on which the training processing has been performed. The monitoring logic transmitting unit 511 may refer to the version information associated with each logic ID in the correspondence tables 501A and 501B, and transmit the monitoring logic 41A in the storage unit 50, that is, the monitoring logic 41A of the latest version to the monitoring device 4 using a monitoring logic 41 that is not of the latest version. Thus, the additionally trained monitoring logic 41A is transmitted to the monitoring device 4 using a monitoring logic 41 of the same type before being additionally trained. The monitoring logic transmitting unit 511 may transmit the additionally trained monitoring logic 41A to a plurality of monitoring devices 4 using the monitoring logic 41 before being additionally trained.

1.3. (3) Training Data Generation Unit 52

The training data generation unit 52 generates training data from the decimated image received from the image receiving unit 510.

The training data generation unit 52 may generate the training data by performing, on the decimated image, image processing of protecting the privacy of a person in the image, or may generate the training data by performing at least one of angle of view correction, brightness correction, or tint correction.

The image processing for protecting the privacy of a person may be, for example, processing of deidentifying a face portion (as one example, mask processing) or processing of expressing joints and bones of the body using dots and lines through skeleton detection, for example. The angle of view correction, brightness correction, and tint correction may be corrections on the decimated image to have a desired angle of view, brightness, and tint, respectively, through an operation by an operator. These corrections may make the target object in the image easy to or difficult to identify. The training data generated may be provided with a tag indicating the camera ID of the monitoring camera 3 with which the decimated image has been captured.

1.3. (4) Training Processing Unit 53

The training processing unit 53 additionally trains one or a plurality of monitoring logics 41A with training data using the decimated image received by the image receiving unit 510. The training processing unit 53 may additionally train another monitoring logic 41A of the same type as the monitoring logic 41 of the monitoring device 4. The additional training on the monitoring logic 41A may further include performing training processing on the trained monitoring logic 41A.

The training processing unit 53 may additionally train the monitoring logic 41A using the training data generated by the training data generation unit 52. The training processing unit 53 may update the monitoring logic 41A in the storage unit 50 through additional training The training processing unit 53 may detect the camera ID from the tag provided to the training data, and read the image capturing condition associated with the camera ID from the correspondence table 501B. The training processing unit 53 may read, from the correspondence table 501A, the logic ID of each monitoring logic 41 corresponding to the image capturing condition read from the correspondence table 501B. The training processing unit 53 may additionally train the monitoring logic 41A with each logic ID thus read, using the training data.

1.4. Monitoring Terminal 7

The monitoring terminal 7 performs the monitoring of the monitored region. The monitoring terminal 7 includes a communication unit 70 and a display unit 71. The communication unit 70 communicates with each monitoring device 4 via the communication network 10. The communication unit 70 may receive the monitoring result from each monitoring device 4 and supply the monitoring result to the display unit 71. The display unit 71 displays the monitoring result received by the communication unit 70. Thus, the monitored region is monitored using the monitoring result.

The monitoring terminal 7 may communicate with the learning apparatus 5. For example, the monitoring terminal 7 may acquire, from the learning apparatus 5, the training status of each monitoring logic 41A in the learning apparatus 5, and the correspondence between the monitoring logic 41A and the monitoring device 4, and display them on the display unit 71. In the present embodiment, as one example, the monitoring terminal 7 may display the version information on each monitoring logic 41A stored in the correspondence table 501A and the device ID of the monitoring device 4 using each monitoring logic 41A.

1. 5. Advantages Obtained Through System 1

1.5. (1) Advantages Obtained Through Monitoring Device 4

With the monitoring device 4 of the system 1 described above, the image supplied to the monitoring logic 41 for generating the monitoring result is decimated and is then transmitted to the learning apparatus 5 to be used for the additional training on the monitoring logic 41A. Thus, the monitoring result is sequentially generated from captured images, and the monitoring logic 41A can be additionally trained with a communication load suppressed due to the use of the decimated image. Furthermore, the internal monitoring logic 41 is updated to the additionally trained monitoring logic 41A. Thus, the monitoring can be performed using the additionally trained monitoring logic 41A, without internally performing the additional training Furthermore, the monitoring result is output to the monitoring terminal 7 and the like, so that the monitoring can be performed using the monitoring result thus output.

1.5.(2) Advantages Obtained Through Learning Apparatus 5

With the learning apparatus 5, the image supplied to the monitoring logic 41 for generating the monitoring result is decimated and is then received from the monitoring device 4 to be used for the additional training on the monitoring logic 41A. Thus, the monitoring device 4 is caused to generate the monitoring result sequentially from images, and the monitoring logic 41A can be additionally trained with a communication load suppressed due to the use of the decimated image. Furthermore, the monitoring logic 41 of the monitoring device 4 is updated to the additionally trained monitoring logic 41A. Thus, the monitoring can be performed using the additionally trained monitoring logic 41A, without causing the monitoring device 4 to internally perform the additional training Furthermore, the additionally trained monitoring logic 41A is transmitted to a plurality of monitoring devices 4 using monitoring logics 41 before being additionally trained. Thus, the monitoring can be performed with the additionally trained monitoring logic, without causing these monitoring devices 4 to perform the training processing.

The training data is generated by performing the image processing for protecting privacy of a person in the image, the image processing being performed on the image received from the monitoring device 4, whereby the privacy of an object can be prevented from being violated by an image received from the monitoring device 4.

Furthermore, with the training data generated by performing at least one of angle of view correction, brightness correction, or tint correction, the correction being performed on the image received from the monitoring device 4, the received image is in a state of being suitable for the training, so that more effective training can be implemented.

2. Correspondence Tables 501A, 501B

FIG. 2 illustrates contents stored in the correspondence table 501A. In the present embodiment, as one example, the correspondence table 501A may store, for each monitoring logic 41A, the logic ID (such as, for example, "L001"), the latest version information (such as, for example, "ver. 4"), the image data image capturing condition suitable for the analysis (such as, for example, the monitoring camera 3 is for indoor use, and the installed location is indoors), and the device ID (such as, for example, "aaa1") of the monitoring device 4 using the same type of monitoring logic 41, in association with each other.

The contents in the correspondence table 501A may be set as desired by the operator. The version information on the monitoring logic 41A may be updated by the training processing unit 53 each time the additional training is performed.

FIG. 3 illustrates contents stored in the correspondence table 501B. In the present embodiment, as one example, the correspondence table 501B may store, for each monitoring device 4, the device ID (such as, for example, "aaa1"), the camera ID of each monitoring camera 3 connected to the monitoring device 4 (such as, for example, "c-01"), the image data image capturing condition by the monitoring camera 3 (such as, for example, the monitoring camera 3 is for indoor use, and the installed location is indoors), the logic ID of each monitoring logic 41 used by the monitoring device 4 (such as, for example, "L001"), and the version information thereof (such as, for example, "ver. 3"), in association with each other.

The contents in the correspondence table 501B may be set as desired by the operator. As one example, the camera ID and the image capturing condition may be updated each time the monitoring camera 3 is exchanged or installed. The version information on the monitoring logic 41 may be updated by the monitoring logic transmitting unit 511 each time the monitoring logic 41A is transmitted.

3. Operation of System 1

3.1. Monitoring Monitored Region

Figure 4:
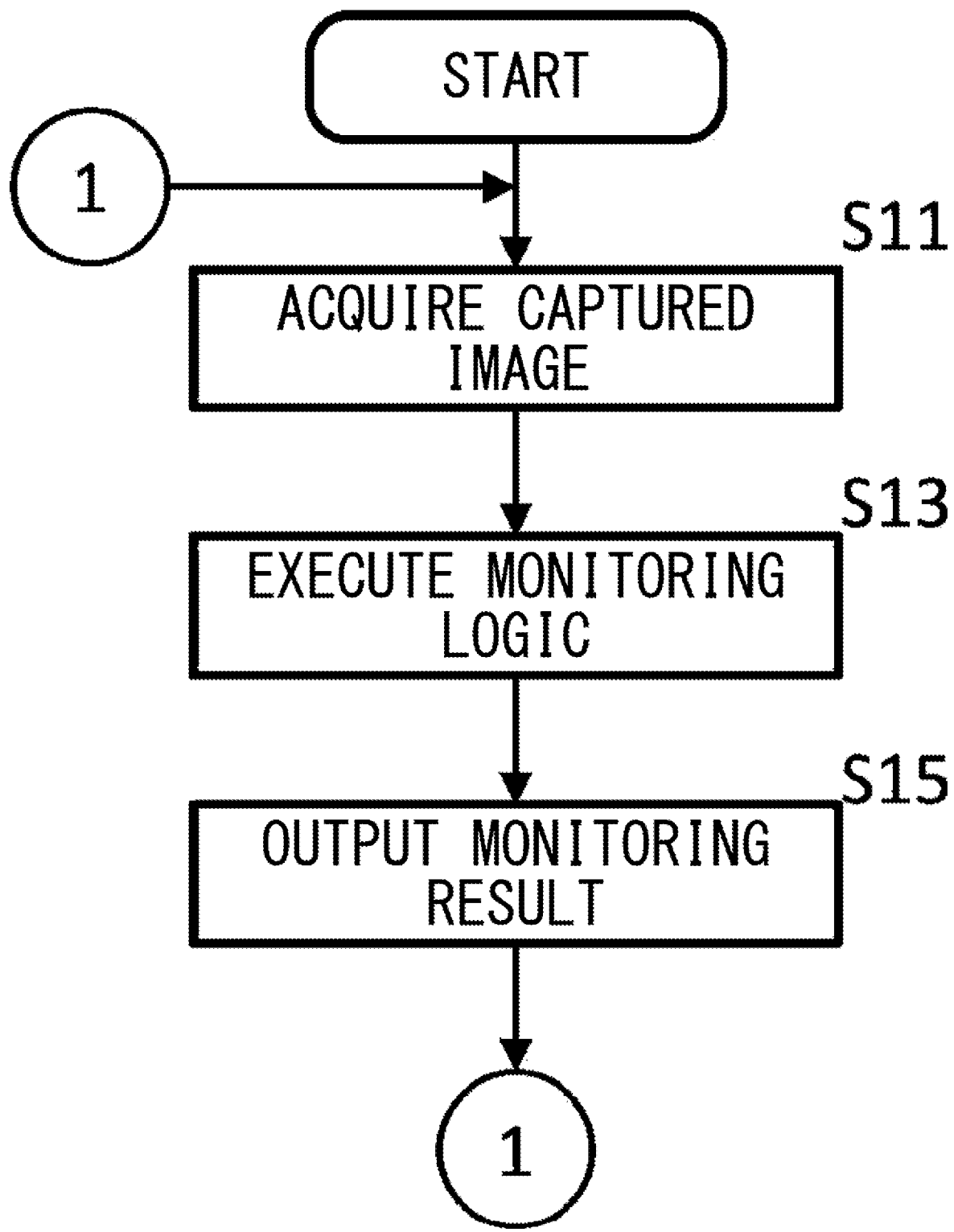
FIG. 4 illustrates an operation related to the monitoring of a monitored region.

FIG. 4 illustrates an operation related to the monitoring of the monitored region. The monitoring device 4 of the system 1 supports the monitoring of the monitored region by performing the processing in steps S11 to S15.

In step S11, the captured image acquiring unit 40 acquires an image captured by the monitoring camera 3. In the present embodiment, as one example, the captured image acquiring unit 40 acquires an image periodically (at a five second interval, for example) from each monitoring camera 3, but may alternatively constantly acquire images.

In step S13, the monitoring logic execution unit 42 generates a monitoring result corresponding to the image captured by the monitoring camera 3 by using the monitoring logic 41. In the present embodiment, as one example, the monitoring logic execution unit 42 may generate, for each monitoring camera 3, the monitoring result including the camera ID of the monitoring camera 3 and a result of determining whether the image-captured region is normal or abnormal. The determination result may include the certainty of the determination. In response to the detection of the target object, the monitoring logic execution unit 42 may generate the monitoring result further including at least one of image data with which the target object is detected, or the feature data of the detected target object. In the processing in step S11, when the captured image acquiring unit 40 constantly acquires images, the processing in step S13 and the processing in step S15 may be executed in parallel with the processing in step S11.

In step S15, the monitoring result output unit 432 outputs the generated monitoring result. In the present embodiment, as one example, the monitoring result output unit 432 may transmit the monitoring result to the monitoring terminal 7. Thus, the monitored region is monitored by the monitoring terminal 7.

3.2. Updating Monitoring Logic 41

Figure 5:
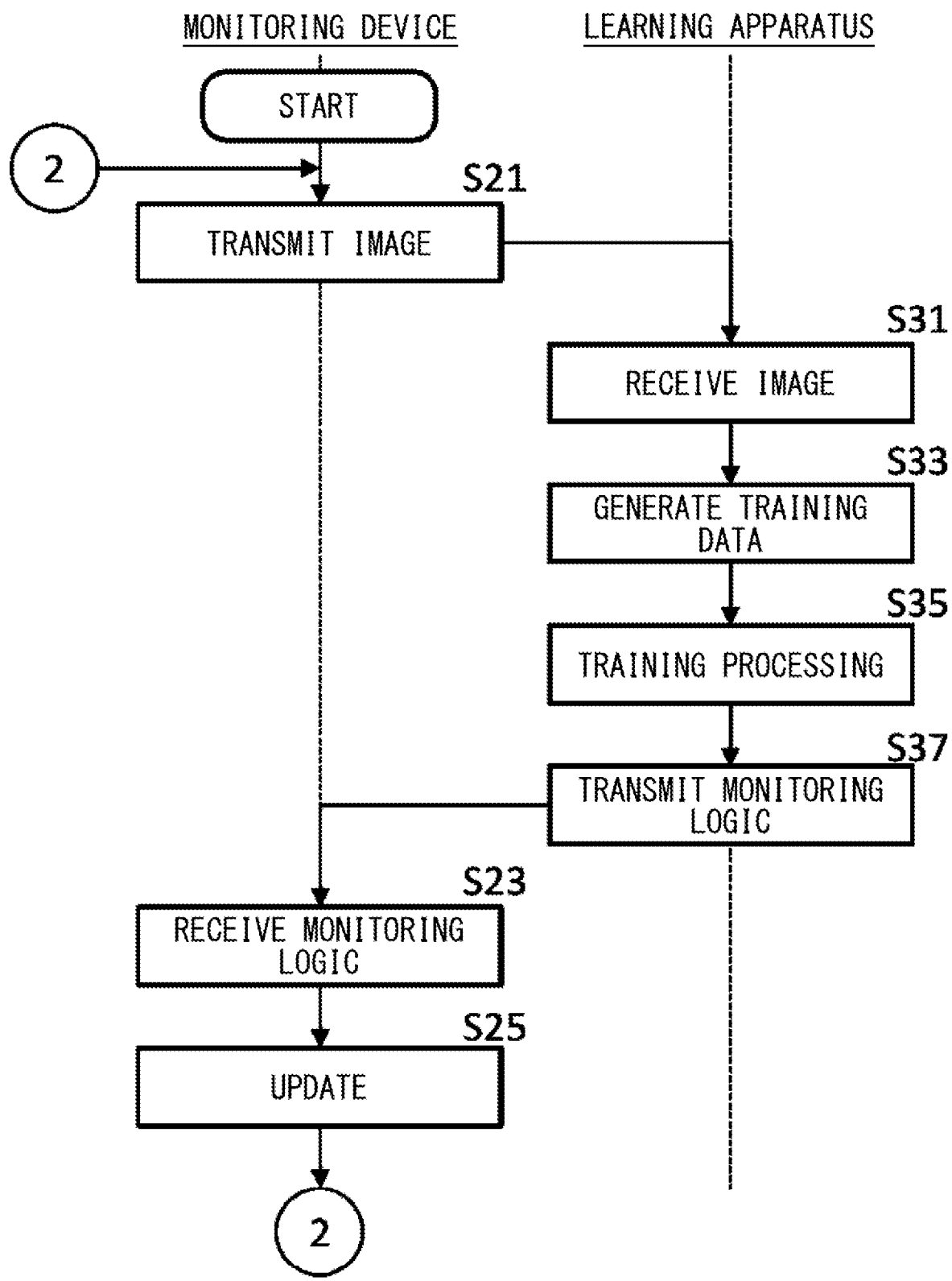
FIG. 5 illustrates an operation related to the updating of a monitoring logic 41.

FIG. 5 illustrates an operation related to the updating of the monitoring logic 41. The system 1 performs the processing in steps S21 to S25 and S31 to S37 to update the monitoring logic 41. This processing may be executed in parallel with the processing in steps S11 to S15.

In step S21, the image transmitting unit 431 decimates the image captured by the monitoring camera 3 and transmits the result to the learning apparatus 5. The image transmitting unit 431 may determine, to be a transmission target image, a part of a plurality of images for each unit amount analyzed by the monitoring logic 41. The image as the unit of analysis may be still image data (as one example, frames included in the moving image data) or a moving image of a reference time width.

The image transmitting unit 431 may determine, to be the transmission target, at least one image for which the monitoring result indicating abnormality is generated. The image transmitting unit 431 may further determine, to be the transmission target, at least one image preceding or following at least one image for which the monitoring result indicating abnormality is generated. The image transmitting unit 431 may detect an image for which the monitoring result indicating abnormality is generated, based on the monitoring result supplied from the monitoring logic execution unit 42.

Additionally or alternatively, the image transmitting unit 431 may determine, to be the transmission target, at least one image for which a monitoring result with the certainty of the determination result by the monitoring logic 41 being lower than a threshold is generated. The image transmitting unit 431 may detect an image for which the monitoring result with the certainty being lower than the threshold is generated, based on the monitoring result supplied from the monitoring logic execution unit 42.

In the present embodiment, as one example, the threshold may be variable. The threshold may be set as desired by the operator. Additionally or alternatively, the threshold may be adjusted by the image transmitting unit 431 in accordance with the amount of images transmitted from the image transmitting unit 431. As one example, the threshold may be changed to a high value when the amount of images transmitted is larger than a reference amount. As a result, the amount of images to be transmission targets, and thus the amount of images transmitted is reduced.

The image transmitting unit 431 may transmit the transmission target image each time such an image is determined, or may collectively transmit images determined to be transmission targets within each reference interval (as one example, a day).

In step S31, the image receiving unit 510 of the learning apparatus 5 receives the decimated image from the monitoring device 4.

In step S33, the training data generation unit 52 generates training data from the decimated image received from the monitoring device 4.

In step S35, the training processing unit 53 additionally trains one or a plurality of monitoring logics 41A with training data using the decimated image received by the image receiving unit 510. The training processing unit 53 may additionally train another monitoring logic 41A of the same type as the monitoring logic 41 of the monitoring device 4. The training processing unit 53 may update the version information on the additionally trained monitoring logic 41A in the correspondence table 501A.

In step S37, the monitoring logic transmitting unit 511 transmits the monitoring logic 41A on which the training processing has been performed by the training processing unit 53 to the monitoring device 4. As one example, the monitoring logic transmitting unit 511 may transmit the monitoring logic 41A to the monitoring device 4 that is the transmission source of the image data. The monitoring logic transmitting unit 511 may update the version information on the monitoring logic 41 associated with the monitoring device 4 that is the transmission destination, in the correspondence table 501B.

In step S23, the monitoring logic receiving unit 433 of the monitoring device 4 receives the additionally trained monitoring logic 41A from the learning apparatus 5.

In step S25, the updating unit 44 updates the monitoring logic 41 executed by the monitoring logic execution unit 42, to the monitoring logic 41A received by the monitoring logic receiving unit 433.

With the operation described above, at least one image for which the monitoring result indicating abnormality is generated is transmitted to the learning apparatus 5, whereby the image for which the monitoring result indicating abnormality is generated can be used for additional training Thus, the training efficiency of the additional training can be improved even when the captured image used for the additional training is decimated.

Furthermore, along with the image for which the monitoring result indicating abnormality is generated, at least one of the images preceding or following the image is transmitted to the learning apparatus 5, whereby the training efficiency of the additional training can be even more improved.

Furthermore, at least one image for which the monitoring result with the certainty being lower than the threshold is generated is transmitted to the learning apparatus 5, whereby images that have not been sufficiently learned can be used for the additional training Thus, the training efficiency of the additional training can be improved even when the captured image used for the additional training is decimated.

Furthermore, the threshold is adjusted in accordance with the amount of images transmitted, whereby the communication load regarding the images can be adjusted as desired.

4. Modifications

In the embodiment described above, the monitoring device 4 is described to include the monitoring logic 41, but may not include the monitoring logic 41. In this case, the monitoring logic execution unit 42 may execute the monitoring logic 41 externally connected to the monitoring device 4.

The monitoring logic transmitting unit 511 is described to transmit the additionally trained monitoring logic 41A to the monitoring device 4 using the monitoring logic 41 of the same type as the monitoring logic 41A, but may transmit the additionally trained monitoring logic 41A to the monitoring device 4 using the monitoring logic 41 of a different type. For example, the monitoring logic transmitting unit 511 may transmit the additionally trained monitoring logic 41 to the monitoring device 4 using the monitoring logic 41 of a different type, in response to a change in the correspondence between the monitoring logic 41 and the monitoring device 4 in the correspondence tables 501A and 501B made by the operator.

Also, various embodiments of the present invention may be described with reference to flowcharts and block diagrams. Blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of computer-readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), a wide area network (WAN) such as the Internet, etc., to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 6:
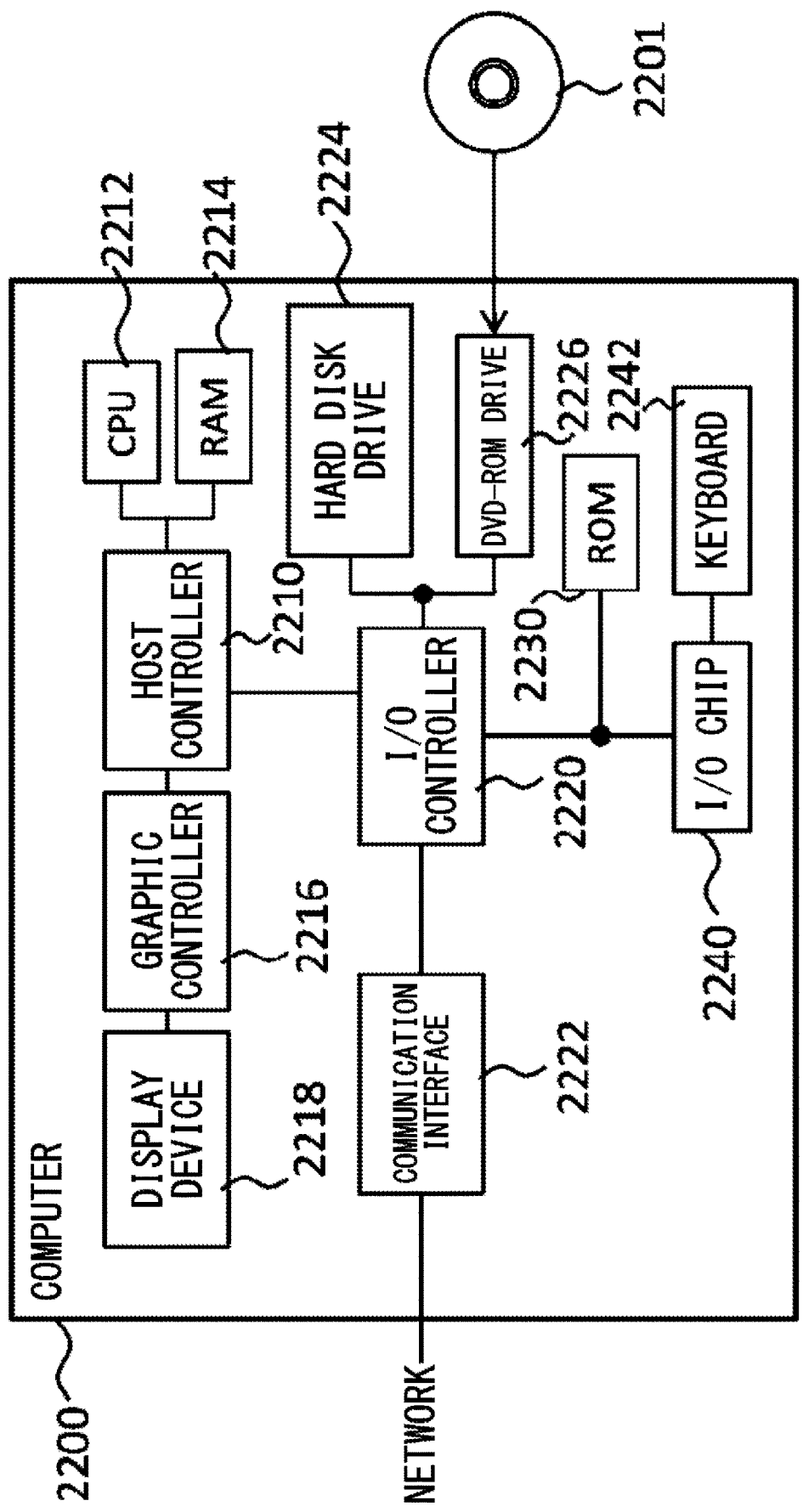
FIG. 6 illustrates an example of a computer 2200 in which a plurality of aspects of the present invention may be wholly or partly embodied.

FIG. 6 illustrates an example of a computer 2200 in which a plurality of aspects of the present invention may be wholly or partly embodied. A program that is installed in the computer 2200 can cause the computer 2200 to function as or execute operations associated with the apparatus of the embodiment of the present invention or one or more sections thereof, and/or cause the computer 2200 to execute the process of the embodiment of the present invention or steps thereof. Such program may be executed by a CPU 2212 so as to cause the computer 2200 to execute certain operations associated with some or all of the blocks of flowcharts and block diagrams described herein.

The computer 2200 according to the present embodiment includes the CPU 2212, a RAM 2214, a graphic controller 2216 and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer 2200 also includes legacy input/output units such as a ROM 2230 and a keyboard 2242, which are connected to the input/output controller 2220 via an input/output chip 2240.

The CPU 2212 is configured to operate according to programs stored in the ROM 2230 and the RAM 2214, thereby controlling each unit. The graphic controller 2216 is configured to acquire image data generated by the CPU 2212 on a frame buffer or the like provided in the RAM 2214 or in itself, and to cause the image data to be displayed on the display device 2218.

The communication interface 2222 is configured to communicate with other electronic devices via a network. The hard disk drive 2224 is configured to store programs and data used by the CPU 2212 within the computer 2200. The DVD-ROM drive 2226 is configured to read the programs or the data from a DVD-ROM 2201, and to provide the hard disk drive 2224 with the programs or the data via the RAM 2214. The IC card drive is configured to read programs and data from an IC card, and/or to write programs and data into the IC card.

The ROM 2230 is configured to store therein a boot program or the like that is executed by the computer 2200 at the time of activation, and/or a program depending on the hardware of the computer 2200. The input/output chip 2240 may also be configured to connect various input/output units to the input/output controller 2220 via a parallel port, a serial port, a keyboard port, a mouse port and the like.

A program is provided by a computer-readable medium such as the DVD-ROM 2201 or the IC card. The program is read from the computer-readable medium, is installed into the hard disk drive 2224, the RAM 2214 or the ROM 2230, which are also examples of the computer-readable medium, and is executed by the CPU 2212. The information processing described in these programs is read into the computer 2200, resulting in cooperation between a program and the above-mentioned various types of hardware resources. A device or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffer processing region provided in a storage medium such as the RAM 2214, the hard disk drive 2224, the DVD-ROM 2201, or the IC card, and transmits the read transmission data to a network or writes reception data received from a network to a reception buffer processing region or the like provided on the storage medium.

In addition, the CPU 2212 may be configured to cause all or a necessary portion of a file or a database, which has been stored in an external storage medium such as the hard disk drive 2224, the DVD-ROM drive 2226 (DVD-ROM 2201), the IC card and the like, to be read into the RAM 2214, thereby executing various types of processing on the data on the RAM 2214. The CPU 2212 is configured to write back the processed data to the external storage medium.

Various types of information, such as various types of programs, data, tables, and databases, may be stored in the storage medium to undergo information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the storage medium. For example, when a plurality of entries, each having an attribute value of a first attribute associated with an attribute value of a second attribute, are stored in the storage medium, the CPU 2212 may search for an entry matching the condition whose attribute value of the first attribute is designated, from the plurality of entries, and read the attribute value of the second attribute stored in the entry, thereby obtaining the attribute value of the second attribute associated with the first attribute satisfying a predetermined condition.

The above-described program or software modules may be stored in the computer-readable medium on the computer 2200 or near the computer 2200. In addition, a storage medium such as a hard disk or a RAM provided in a server system connected to a dedicated communication network or the Internet can be used as the computer-readable medium, thereby providing the programs to the computer 2200 via the network.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method illustrated in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 system
3 monitoring camera
4 monitoring device
5 learning apparatus
7 monitoring terminal
10 communication network
40 captured image acquiring unit
41 monitoring logic
42 monitoring logic execution unit
43 communication unit
44 updating unit
50 storage unit
51 communication unit
52 training data generation unit
53 training processing unit
70 communication unit
71 display unit
431 image transmitting unit
432 monitoring result output unit
433 monitoring logic receiving unit
501 correspondence table
510 image receiving unit
511 monitoring logic transmitting unit
2200 computer
2201 DVD-ROM
2210 host controller
2212 CPU
2214 RAM
2216 graphic controller
2218 display device
2220 input/output controller
2222 communication interface
2224 hard disk drive
2226 DVD-ROM drive 2230 ROM
2240 input/output chip
2242 keyboard

What is claimed is:

1. A system for monitoring an image-captured region comprising:
   a monitoring device for monitoring the image-captured region which is captured by a monitoring camera, the monitoring device comprising:
   a captured image acquiring unit configured to acquire an image captured by the monitoring camera;
   a monitoring logic execution unit configured to generate a monitoring result corresponding to the image captured by the monitoring camera, by using a trained first monitoring logic, the monitoring result including a determination result indicating whether the image-captured region is normal or abnormal, the first monitoring logic outputting the determination result whether the image-captured region is normal or abnormal in response to an input of image data;
   an image transmitting unit configured to decimate the image captured by the monitoring camera and transmit the decimated image to a learning apparatus performing training processing on a second monitoring logic of a same type as the monitoring logic;
   a monitoring logic receiving unit configured to receive, from the learning apparatus, the second monitoring logic additionally trained by the learning apparatus by using the decimated image from the image transmitting unit; and
   an updating unit configured to update the first monitoring logic executed by the monitoring logic execution unit to the second monitoring logic received by the monitoring logic receiving unit, wherein
   the image transmitting unit transmits, as the decimated image, at least one image for which the determination result indicating abnormality is generated, and
   a learning apparatus comprising:
   an image receiving unit configured to receive the captured and decimated image from the monitoring device; a training processing unit configured to train a second monitoring logic with training data using the image received by the image receiving unit; a monitoring logic transmitting unit configured to transmit the trained second monitoring logic to the monitoring device; and a storage unit configured to store a first table that associates identification information of a monitoring logic with an image capturing condition suitable for an analysis with the monitoring logic, and a second table that associates identification information of a monitoring camera with an image capturing condition of the monitoring camera, wherein the training processing unit is configured to read, from the second table, an image capturing condition associated with the monitoring camera that captures the image received by the image receiving unit, read, from the first table, identification information of a monitoring logic associated with the image capturing condition, and train the monitoring logic of the identification information with training data using the image.

2. The system for monitoring an image-captured region according to claim 1, wherein the image transmitting unit further transmits at least one image proceeding or following the at least one image for which the monitoring result indicating abnormality is generated.

3. The system for monitoring an image-captured region according to claim 1, wherein the image transmitting unit transmits at least one image for which the monitoring result with a certainty being lower than a threshold is generated.

4. The system for monitoring an image-captured region according to claim 3, wherein the image transmitting unit adjusts the threshold in accordance with an amount of images transmitted.

5. The monitoring device according to claim 1, comprising a monitoring result output unit configured to output the monitoring result.

6. The system for monitoring an image-captured region according to claim 1, wherein the monitoring logic transmitting unit transmits the second monitoring logic additionally trained to a plurality of monitoring devices using the monitoring logic before being additionally trained.

7. The system for monitoring an image-captured region according to claim 1, wherein the learning apparatus further comprises a training data generation unit configured to generate the training data by performing image processing for protecting privacy of a person in the image, the image processing being performed on the image received from the monitoring device.

8. The system for monitoring an image-captured region according to claim 6, wherein the learning apparatus further comprises a training data generation unit configured to generate the training data by performing image processing for protecting privacy of a person in the image, the image processing being performed on the image received from the monitoring device.

9. The system for monitoring an image-captured region according to claim 1, wherein the learning apparatus further comprises a training data generation unit configured to generate the training data by performing at least one of angle of view correction, brightness correction, and tint correction, the correction being performed on the image received from the monitoring device.

10. The system for monitoring an image-captured region according to claim 6, wherein the learning apparatus further comprises a training data generation unit configured to generate the training data by performing at least one of angle of view correction, brightness correction, and tint correction, the correction being performed on the image received from the monitoring device.

11. A method comprising:
    a monitoring step of monitoring an image-captured region which is captured by a monitoring camera;
    a captured image acquiring step of acquiring an image captured by the monitoring camera;
    a monitoring logic execution step of generating a monitoring result corresponding to the image captured by the monitoring camera, by using a trained first monitoring logic, the monitoring result including a determination result indicating whether the image-captured region is normal or abnormal, the first monitoring logic outputting the determination result whether the image-captured region is normal or abnormal in response to an input of image data;
    an image transmitting step of decimating the image captured by the monitoring camera and transmitting the decimated image to a learning apparatus performing training processing on a second monitoring logic of a same type as the monitoring logic;
    a monitoring logic receiving step of receiving, from the learning apparatus, the second monitoring logic additionally trained by the learning apparatus by using the decimated image transmitted in the image transmitting step; and an updating step of updating the first monitoring logic executed in the monitoring logic execution step to the second monitoring logic received in the monitoring logic receiving step, wherein the image transmitting step transmits, as the decimated image, at least one image for which the determination result indicating abnormality is generated, and a learning step comprising:

an image receiving step to receive the captured and decimated image;

a training processing step to train a second monitoring logic with training data using the image received by the image receiving step;

a monitoring logic transmitting step to transmit the trained second monitoring logic to the monitoring device; and a storage step configured to store a first table that associates identification information of a monitoring logic with an image capturing condition suitable for an analysis with the monitoring logic, and a second table that associates identification information of a monitoring camera with an image capturing condition of the monitoring camera, wherein the training processing step comprises:

reading, from the second table, an image capturing condition associated with the monitoring camera that captures the image received by the image receiving step, reading, from the first table, identification information of a monitoring logic associated with the image capturing condition, and training the monitoring logic of the identification information with training data using the image.

12. A non-transitory storage medium having a program stored thereon, the program causing a computer to function as a system for monitoring an image-captured region comprising:

a monitoring device for monitoring the image-captured region which is captured by a monitoring camera, the monitoring device comprising:

a captured image acquiring unit configured to acquire an image captured by the monitoring camera;

a monitoring logic execution unit configured to generate a monitoring result corresponding to the image captured by the monitoring camera, by using a trained first monitoring logic, the monitoring result including a determination result indicating whether the image-captured region is normal or abnormal, the first monitoring logic outputting the determination result whether the image-captured region is normal or abnormal in response to an input of image data;

an image transmitting unit configured to decimate the image captured by the monitoring camera and transmit the decimated image a result to a learning apparatus performing training processing on another a second monitoring logic of a same type as the monitoring logic;

a monitoring logic receiving unit configured to receive, from the learning apparatus, the other second monitoring logic additionally trained by the learning apparatus by using the decimated image from the image transmitting unit; and an updating unit configured to update the first monitoring logic executed by the monitoring logic execution unit to the other second monitoring logic received by the monitoring logic receiving unit, wherein the image transmitting unit transmits, as the decimated image, at least one image for which the determination result indicating abnormality is generated, and a learning apparatus comprising:

an image receiving unit configured to receive the captured and decimated image from the monitoring device; a training processing unit configured to train a second monitoring logic with training data using the image received by the image receiving unit; a monitoring logic transmitting unit configured to transmit the trained second monitoring logic to the monitoring device; and a storage unit configured to store a first table that associates identification information of a monitoring logic with an image capturing condition suitable for an analysis with the monitoring logic, and a second table that associates identification information of a monitoring camera with an image capturing condition of the monitoring camera, wherein the training processing unit is configured to read, from the second table, an image capturing condition associated with the monitoring camera that captures the image received by the image receiving unit, read, from the first table, identification information of a monitoring logic associated with the image capturing condition, and train the monitoring logic of the identification information with training data using the image.

* * * * *